US007807488B2

(12) United States Patent
Gally et al.

(10) Patent No.: US 7,807,488 B2
(45) Date of Patent: Oct. 5, 2010

(54) DISPLAY ELEMENT HAVING FILTER MATERIAL DIFFUSED IN A SUBSTRATE OF THE DISPLAY ELEMENT

(75) Inventors: Brian J. Gally, Los Gatos, CA (US); William J. Cummings, Millbrae, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 430 days.

(21) Appl. No.: 11/213,644

(22) Filed: Aug. 19, 2005

(65) Prior Publication Data

US 2006/0067600 A1    Mar. 30, 2006

Related U.S. Application Data

(60) Provisional application No. 60/613,481, filed on Sep. 27, 2004.

(51) Int. Cl.
 *H01L 21/00* (2006.01)
(52) U.S. Cl. .............................. 438/34; 438/155; 349/30
(58) Field of Classification Search .................. 438/28, 438/29, 30, 34; 257/59, 72; 345/44, 45, 345/76; 349/30
See application file for complete search history.

(56) References Cited

U.S. PATENT DOCUMENTS

| | | | |
|---|---|---|---|
| 3,443,854 | A | 5/1969 | Weiss |
| 3,448,334 | A | 6/1969 | Frost |
| 3,653,741 | A | 4/1972 | Marks |
| 3,679,313 | A | 7/1972 | Rosenberg |
| 3,725,868 | A | 4/1973 | Malmer, Jr. et al. |
| 3,886,310 | A | 5/1975 | Guldberg |
| 4,196,396 | A | 4/1980 | Smith |
| 4,287,449 | A | 9/1981 | Takeda et al. |
| 4,377,324 | A | 3/1983 | Durand et al. |
| 4,389,096 | A | 6/1983 | Hori et al. |
| 4,421,381 | A | 12/1983 | Ueda et al. |
| 4,441,791 | A | 4/1984 | Hornbeck |
| 4,790,635 | A | 12/1988 | Apsley |

(Continued)

FOREIGN PATENT DOCUMENTS

CN    1158182    8/1997

(Continued)

OTHER PUBLICATIONS

International Search Report for PCT/US2005/032886, *International Searching Authority*, Sep. 14, 2005.

(Continued)

*Primary Examiner*—Brook Kebede
(74) *Attorney, Agent, or Firm*—Knobbe Martens Olson & Bear, LLP

(57) ABSTRACT

Optical filter functionality is incorporated into a substrate of a display element thereby decreasing the need for a separate thin film filter and, accordingly, reducing a total thickness of a filtered display element. Filter functionality may be provided by any filter material, such as pigment materials, photoluminescent materials, and opaque material, for example. The filter material may be incorporated in the substrate at the time of creating the substrate or may be selectively diffused in the substrate through a process of masking the substrate, exposing the substrate to the filter material, and heating the substrate in order to diffuse the filter material in the substrate.

30 Claims, 12 Drawing Sheets

U.S. PATENT DOCUMENTS

| | | | |
|---|---|---|---|
| 4,832,459 A | 5/1989 | Harper et al. | |
| 4,859,060 A | 8/1989 | Katagari et al. | |
| 4,961,617 A | 10/1990 | Shahidi | |
| 4,980,775 A | 12/1990 | Brody | |
| 4,982,184 A | 1/1991 | Kirkwood | |
| 5,022,745 A | 6/1991 | Zahowski et al. | |
| 5,044,736 A | 9/1991 | Jaskie et al. | |
| 5,142,414 A | 8/1992 | Koehler | |
| 5,164,858 A | 11/1992 | Aguilera, Jr. et al. | |
| 5,192,946 A | 3/1993 | Thompson et al. | |
| 5,233,385 A | 8/1993 | Sampsell | |
| 5,287,215 A | 2/1994 | Warde et al. | |
| 5,293,272 A | 3/1994 | Jannson et al. | |
| 5,311,360 A | 5/1994 | Bloom et al. | |
| 5,326,426 A | 7/1994 | Tam et al. | |
| 5,345,322 A | 9/1994 | Fergason et al. | |
| 5,365,283 A | 11/1994 | Doherty et al. | |
| 5,398,170 A | 3/1995 | Lee | |
| 5,448,314 A | 9/1995 | Heimbuch et al. | |
| 5,452,385 A | 9/1995 | Izumi et al. | |
| 5,474,865 A | 12/1995 | Vasudev | |
| 5,517,347 A | 5/1996 | Sampsell | |
| 5,550,373 A | 8/1996 | Cole et al. | |
| 5,606,441 A | 2/1997 | Florence et al. | |
| 5,619,059 A | 4/1997 | Li et al. | |
| 5,619,365 A | 4/1997 | Rhoades et al. | |
| 5,619,366 A | 4/1997 | Rhoads et al. | |
| 5,633,739 A | 5/1997 | Matsuyama | |
| 5,739,945 A | 4/1998 | Tayebati | |
| 5,745,281 A | 4/1998 | Yi et al. | |
| 5,754,260 A * | 5/1998 | Ooi et al. | 349/10 |
| 5,805,117 A | 9/1998 | Mazurek | |
| 5,815,229 A | 9/1998 | Shapiro et al. | |
| 5,835,255 A | 11/1998 | Miles | |
| 5,835,256 A | 11/1998 | Huibers | |
| 5,853,310 A | 12/1998 | Nishimura | |
| 5,868,480 A | 2/1999 | Zeinali | |
| 5,886,688 A | 3/1999 | Fifield | |
| 5,892,598 A | 4/1999 | Asakawa et al. | |
| 5,914,804 A | 6/1999 | Goossen et al. | |
| 5,920,417 A | 7/1999 | Johnson | |
| 5,933,183 A | 8/1999 | Enomoto | |
| 5,959,763 A | 9/1999 | Bozler et al. | |
| 5,986,796 A | 11/1999 | Miles et al. | |
| 5,991,073 A | 11/1999 | Woodgate | |
| 6,028,690 A | 2/2000 | Carter et al. | |
| 6,031,653 A | 2/2000 | Wang et al. | |
| 6,040,937 A | 3/2000 | Miles | |
| 6,046,840 A | 4/2000 | Huibers | |
| 6,055,090 A | 4/2000 | Miles | |
| 6,088,102 A | 7/2000 | Manhart | |
| 6,113,239 A | 9/2000 | Sampsell et al. | |
| 6,195,196 B1 | 2/2001 | Kimura et al. | |
| 6,201,633 B1 | 3/2001 | Peeters et al. | |
| 6,243,149 B1 | 6/2001 | Swanson et al. | |
| 6,278,135 B1 | 8/2001 | Srivastava | |
| 6,282,010 B1 | 8/2001 | Sulzbach et al. | |
| 6,285,424 B1 | 9/2001 | Yoshida | |
| 6,288,824 B1 | 9/2001 | Kastalsky | |
| 6,301,000 B1 | 10/2001 | Johnson | |
| 6,323,923 B1 | 11/2001 | Hoshino | |
| 6,342,970 B1 | 1/2002 | Sperger et al. | |
| 6,356,378 B1 | 3/2002 | Huibers | |
| 6,377,233 B2 | 4/2002 | Colgan et al. | |
| 6,381,022 B1 | 4/2002 | Zavracky et al. | |
| 6,399,257 B1 | 6/2002 | Shirota et al. | |
| 6,400,738 B1 | 6/2002 | Tucker | |
| 6,412,969 B1 | 7/2002 | Torihara et al. | |
| 6,448,709 B1 | 9/2002 | Chuang et al. | |
| 6,456,279 B1 | 9/2002 | Kubo | |
| 6,466,354 B1 | 10/2002 | Gudeman | |
| 6,466,358 B2 | 10/2002 | Tew | |
| 6,483,613 B1 | 11/2002 | Woodgate et al. | |
| 6,518,944 B1 | 2/2003 | Doane | |
| 6,519,073 B1 | 2/2003 | Goossen | |
| 6,538,813 B1 | 3/2003 | Magno et al. | |
| 6,549,338 B1 | 4/2003 | Wolverton et al. | |
| 6,574,033 B1 | 6/2003 | Chui | |
| 6,597,419 B1 | 7/2003 | Masakazu et al. | |
| 6,597,490 B2 | 7/2003 | Tayebati | |
| 6,598,987 B1 | 7/2003 | Parikka | |
| 6,630,786 B2 | 10/2003 | Cummings et al. | |
| 6,636,322 B1 | 10/2003 | Terashita | |
| 6,642,913 B1 | 11/2003 | Chuang et al. | |
| 6,643,069 B2 | 11/2003 | Dewald | |
| 6,650,455 B2 | 11/2003 | Miles | |
| 6,674,562 B1 | 1/2004 | Miles | |
| 6,680,792 B2 | 1/2004 | Miles | |
| 6,683,693 B1 | 1/2004 | Otsuka et al. | |
| 6,738,194 B1 | 5/2004 | Ramirez et al. | |
| 6,741,377 B2 | 5/2004 | Miles | |
| 6,744,960 B2 | 6/2004 | Pelka | |
| 6,760,135 B1 | 7/2004 | Payne | |
| 6,768,555 B2 | 7/2004 | Chen et al. | |
| 6,773,126 B1 | 8/2004 | Hatjasalo et al. | |
| 6,778,746 B2 | 8/2004 | Charlton | |
| 6,794,119 B2 | 9/2004 | Miles | |
| 6,798,469 B2 | 9/2004 | Koichi | |
| 6,811,267 B1 | 11/2004 | Allen et al. | |
| 6,822,628 B2 | 11/2004 | Dunphy et al. | |
| 6,822,780 B1 | 11/2004 | Long, Jr. | |
| 6,825,969 B2 | 11/2004 | Chen et al. | |
| 6,841,787 B2 | 1/2005 | Almogy | |
| 6,844,959 B2 | 1/2005 | Huibers | |
| 6,853,129 B1 | 2/2005 | Cummings et al. | |
| 6,870,581 B2 | 3/2005 | Li et al. | |
| 6,880,959 B2 | 4/2005 | Houston | |
| 6,882,458 B2 | 4/2005 | Lin et al. | |
| 6,882,461 B1 | 4/2005 | Tsai et al. | |
| 6,885,377 B2 | 4/2005 | Lim | |
| 6,912,022 B2 | 6/2005 | Lin et al. | |
| 6,917,469 B2 | 7/2005 | Momose et al. | |
| 6,930,816 B2 | 8/2005 | Mochizuki | |
| 6,967,779 B2 | 11/2005 | Fadel | |
| 6,982,820 B2 | 1/2006 | Tsai | |
| 6,995,890 B2 | 2/2006 | Lin et al. | |
| 6,999,225 B2 | 2/2006 | Lin et al. | |
| 6,999,236 B2 | 2/2006 | Lin et al. | |
| 7,002,726 B2 | 2/2006 | Patel | |
| 7,006,272 B2 | 2/2006 | Tsai | |
| 7,009,754 B2 | 3/2006 | Huibers | |
| 7,016,095 B2 | 3/2006 | Lin | |
| 7,034,981 B2 | 4/2006 | Makigaki | |
| 7,038,752 B2 | 5/2006 | Lin | |
| 7,042,643 B2 | 5/2006 | Miles | |
| 7,072,093 B2 | 7/2006 | Piehl et al. | |
| 7,072,096 B2 | 7/2006 | Holman et al. | |
| 7,110,158 B2 | 9/2006 | Miles | |
| 7,113,339 B2 | 9/2006 | Taguchi | |
| 7,123,216 B1 | 10/2006 | Miles | |
| 7,126,738 B2 | 10/2006 | Miles | |
| 7,138,984 B1 | 11/2006 | Miles | |
| 7,142,347 B2 | 11/2006 | Islam | |
| 7,161,728 B2 | 1/2007 | Sampsell et al. | |
| 7,161,730 B2 | 1/2007 | Floyd | |
| 7,172,915 B2 | 2/2007 | Lin et al. | |
| 7,218,429 B2 | 5/2007 | Batchko | |
| 7,218,812 B2 | 5/2007 | Maxwell | |
| 7,304,784 B2 | 12/2007 | Chui | |
| 7,336,329 B2 | 2/2008 | Yoon | |
| 7,342,705 B2 | 3/2008 | Chui et al. | |
| 7,342,709 B2 | 3/2008 | Lin | |
| 7,349,141 B2 | 3/2008 | Tung et al. | |
| 7,372,449 B2 | 5/2008 | Kodama et al. | |

| | | |
|---|---|---|
| 7,561,323 B2 | 7/2009 | Gally |
| 7,603,001 B2 | 10/2009 | Wang |
| 2001/0019380 A1 | 9/2001 | Ishihara |
| 2001/0019479 A1 | 9/2001 | Nakabayashi et al. |
| 2001/0049061 A1 | 12/2001 | Nakagaki et al. |
| 2001/0055208 A1 | 12/2001 | Koichi |
| 2002/0015215 A1 | 2/2002 | Miles |
| 2002/0018632 A1 | 2/2002 | Pelka |
| 2002/0024711 A1 | 2/2002 | Miles |
| 2002/0054424 A1 | 5/2002 | Miles |
| 2002/0075555 A1 | 6/2002 | Miles |
| 2002/0080465 A1 | 6/2002 | Han |
| 2002/0106182 A1 | 8/2002 | Kawashima |
| 2002/0126364 A1 | 9/2002 | Miles |
| 2002/0131151 A1 | 9/2002 | Engler et al. |
| 2002/0149584 A1 | 10/2002 | Simpson |
| 2002/0167730 A1 | 11/2002 | Needham et al. |
| 2003/0011864 A1 | 1/2003 | Flanders |
| 2003/0043157 A1 | 3/2003 | Miles |
| 2003/0083429 A1 | 5/2003 | Smith |
| 2003/0095401 A1 | 5/2003 | Hanson |
| 2003/0107692 A1* | 6/2003 | Sekiguchi .................. 349/113 |
| 2003/0151821 A1 | 8/2003 | Favalora et al. |
| 2003/0160919 A1 | 8/2003 | Yutaka et al. |
| 2003/0161040 A1 | 8/2003 | Ishii |
| 2003/0169385 A1 | 9/2003 | Okuwaki |
| 2003/0179383 A1 | 9/2003 | Chen et al. |
| 2003/0193630 A1 | 10/2003 | Chiou |
| 2003/0210363 A1 | 11/2003 | Yasukawa et al. |
| 2003/0214621 A1 | 11/2003 | Kim et al. |
| 2004/0017599 A1 | 1/2004 | Yang |
| 2004/0027315 A1 | 2/2004 | Senda et al. |
| 2004/0027636 A1 | 2/2004 | Miles |
| 2004/0051929 A1 | 3/2004 | Sampsell et al. |
| 2004/0066477 A1 | 4/2004 | Morimoto et al. |
| 2004/0070711 A1 | 4/2004 | Wen et al. |
| 2004/0080807 A1 | 4/2004 | Chen et al. |
| 2004/0115339 A1 | 6/2004 | Ito |
| 2004/0125048 A1 | 7/2004 | Toshihiro et al. |
| 2004/0125281 A1 | 7/2004 | Lin |
| 2004/0174583 A1 | 9/2004 | Chen et al. |
| 2004/0175577 A1 | 9/2004 | Lin et al. |
| 2004/0217919 A1 | 11/2004 | Piehl et al. |
| 2004/0218251 A1 | 11/2004 | Piehl et al. |
| 2004/0218390 A1 | 11/2004 | Holman et al. |
| 2004/0233357 A1 | 11/2004 | Fujimori |
| 2005/0002082 A1 | 1/2005 | Miles |
| 2005/0010568 A1 | 1/2005 | Nagatomo |
| 2005/0035699 A1 | 2/2005 | Tsai |
| 2005/0036095 A1 | 2/2005 | Yeh et al. |
| 2005/0042117 A1 | 2/2005 | Lin |
| 2005/0046919 A1 | 3/2005 | Taguchi |
| 2005/0057442 A1 | 3/2005 | Way |
| 2005/0069209 A1 | 3/2005 | Damera-Venkata et al. |
| 2005/0101059 A1 | 5/2005 | Yang |
| 2005/0120553 A1 | 6/2005 | Brown |
| 2005/0133761 A1 | 6/2005 | Thielemans |
| 2005/0179977 A1 | 8/2005 | Chui et al. |
| 2005/0195370 A1 | 9/2005 | Gore |
| 2005/0195462 A1 | 9/2005 | Lin |
| 2005/0225686 A1 | 10/2005 | Brummack |
| 2005/0271325 A1 | 12/2005 | Anderson |
| 2005/0286113 A1 | 12/2005 | Miles |
| 2006/0001942 A1 | 1/2006 | Chui |
| 2006/0002141 A1 | 1/2006 | Ouderkirk et al. |
| 2006/0012733 A1 | 1/2006 | Jin |
| 2006/0022966 A1 | 2/2006 | Mar |
| 2006/0028708 A1 | 2/2006 | Miles |
| 2006/0066541 A1 | 3/2006 | Gally |
| 2006/0066586 A1 | 3/2006 | Gally |
| 2006/0066935 A1 | 3/2006 | Cummings et al. |
| 2006/0067633 A1 | 3/2006 | Gally |
| 2006/0067651 A1 | 3/2006 | Chui |
| 2006/0077122 A1 | 4/2006 | Gally |
| 2006/0077123 A1 | 4/2006 | Gally |
| 2006/0077124 A1 | 4/2006 | Gally |
| 2006/0077126 A1 | 4/2006 | Kothari |
| 2006/0077127 A1 | 4/2006 | Sampsell |
| 2006/0077149 A1 | 4/2006 | Gally |
| 2006/0077154 A1 | 4/2006 | Gally |
| 2006/0077512 A1 | 4/2006 | Cummings |
| 2006/0103912 A1 | 5/2006 | Katoh |
| 2006/0109682 A1 | 5/2006 | Ko et al. |
| 2006/0110090 A1 | 5/2006 | Ellwood |
| 2006/0132383 A1 | 6/2006 | Gally |
| 2006/0187676 A1 | 8/2006 | Ishikura |
| 2006/0198013 A1 | 9/2006 | Sampsell |
| 2006/0209012 A1 | 9/2006 | Hagood |
| 2006/0209385 A1 | 9/2006 | Liu |
| 2006/0227532 A1 | 10/2006 | Ko et al. |
| 2006/0250676 A1 | 11/2006 | Hagood, IV |
| 2006/0274243 A1 | 12/2006 | Iijima et al. |
| 2006/0274400 A1 | 12/2006 | Miles |
| 2007/0031685 A1 | 2/2007 | Ko et al. |
| 2007/0042524 A1 | 2/2007 | Kogut |
| 2007/0147087 A1 | 6/2007 | Parker |
| 2007/0196040 A1 | 8/2007 | Wang |
| 2007/0201234 A1 | 8/2007 | Ottermann |
| 2007/0210163 A1 | 9/2007 | Han |
| 2007/0247704 A1 | 10/2007 | Mignard |
| 2007/0279727 A1 | 12/2007 | Gandhi |
| 2008/0090025 A1 | 4/2008 | Freking |
| 2008/0112039 A1 | 5/2008 | Chui |
| 2008/0151347 A1 | 6/2008 | Chui |
| 2008/0180777 A1 | 7/2008 | Tung et al. |
| 2008/0218834 A1 | 9/2008 | Wang |
| 2008/0232135 A1 | 9/2008 | Kinder |
| 2009/0050454 A1 | 2/2009 | Matsukawa |
| 2009/0086301 A1 | 4/2009 | Gally |
| 2009/0090611 A1 | 4/2009 | Zeijlon |
| 2009/0103161 A1 | 4/2009 | Kothari |
| 2009/0103165 A1 | 4/2009 | Kothari |
| 2009/0147535 A1 | 6/2009 | Mienko |
| 2009/0190373 A1 | 7/2009 | Bita et al. |
| 2009/0225396 A1 | 9/2009 | Sampsell |
| 2009/0296194 A1 | 12/2009 | Gally |

FOREIGN PATENT DOCUMENTS

| | | |
|---|---|---|
| CN | 1272922 | 11/2000 |
| CN | 1286424 | 3/2001 |
| CN | 1381752 A | 11/2002 |
| CN | 1517743 | 8/2004 |
| DE | 34 02 746 | 8/1985 |
| DE | 3402746 A1 | 8/1985 |
| DE | 196 22 748 | 12/1997 |
| EP | 0 590 511 | 4/1994 |
| EP | 0 667 548 | 8/1995 |
| EP | 0 822 441 | 2/1998 |
| EP | 0 830 032 | 3/1998 |
| EP | 0 855 745 A2 | 7/1998 |
| EP | 1 003 062 | 5/2000 |
| EP | 1 014 161 A1 | 6/2000 |
| EP | 1 081 633 | 3/2001 |
| EP | 1 251 454 | 4/2002 |
| EP | 1 271 223 | 6/2002 |
| EP | 1 336 876 | 8/2003 |
| EP | 1 341 025 | 9/2003 |
| EP | 1 389 775 | 2/2004 |
| EP | 1 413 543 | 4/2004 |
| EP | 1 450 418 | 8/2004 |
| EP | 1 640 764 | 3/2006 |
| EP | 1 640 767 | 3/2006 |
| EP | 1 640 770 | 3/2006 |
| EP | 1 640 779 | 3/2006 |
| EP | 1 640 780 | 3/2006 |

| | | |
|---|---|---|
| EP | 1640313 | 3/2006 |
| GB | 2278222 | 11/1994 |
| GB | 2321532 | 7/1998 |
| JP | 56 088111 | 7/1981 |
| JP | 60 147718 | 8/1985 |
| JP | 62-009317 | 1/1987 |
| JP | 02-068513 | 3/1990 |
| JP | 04-081816 | 3/1992 |
| JP | 04 190323 | 7/1992 |
| JP | 04 238321 | 8/1992 |
| JP | 08 018990 | 1/1996 |
| JP | 08 189990 | 1/1996 |
| JP | 08018990 A | 1/1996 |
| JP | 08 094992 | 4/1996 |
| JP | 09 068722 | 3/1997 |
| JP | 09 189869 | 7/1997 |
| JP | 09 281917 | 10/1997 |
| JP | 09281917 A | 10/1997 |
| JP | 11 002712 | 1/1999 |
| JP | 11 002764 | 1/1999 |
| JP | 11 174234 | 7/1999 |
| JP | 11174234 A | 7/1999 |
| JP | 11 211999 | 8/1999 |
| JP | 11-211999 | 8/1999 |
| JP | 11 295725 | 10/1999 |
| JP | 2000 075293 | 3/2000 |
| JP | 2000 193933 | 7/2000 |
| JP | 2000 214804 A | 8/2000 |
| JP | 2000-258622 | 9/2000 |
| JP | 2000 514568 | 10/2000 |
| JP | 2000 193933 | 11/2000 |
| JP | 2001 305312 | 10/2001 |
| JP | 2001305312 | 10/2001 |
| JP | 2001 343514 | 12/2001 |
| JP | 2001/343514 A | 12/2001 |
| JP | 2002-062505 | 2/2002 |
| JP | 2002-174780 | 6/2002 |
| JP | 2002-523798 | 7/2002 |
| JP | 2002 245835 | 8/2002 |
| JP | 2002-287047 | 10/2002 |
| JP | 2002-245835 | 12/2002 |
| JP | 2003-131215 | 5/2003 |
| JP | 2003 131215 | 5/2003 |
| JP | 2003 315694 | 11/2003 |
| JP | 2003-315694 | 11/2003 |
| JP | 2004-111278 | 4/2004 |
| JP | 2004-206049 | 7/2004 |
| JP | 2004-212673 | 7/2004 |
| JP | 2004-212922 | 7/2004 |
| JP | 2006 120571 | 5/2006 |
| KR | 2002/010322 A | 2/2002 |
| KR | 2003-29769 | 3/2002 |
| TW | 594155 | 6/2004 |
| WO | WO 95/01584 | 1/1995 |
| WO | WO 95/14256 A1 | 5/1995 |
| WO | WO 95/30924 | 11/1995 |
| WO | WO 96/08833 | 3/1996 |
| WO | WO 97/17628 | 5/1997 |
| WO | WO 97/44707 | 11/1997 |
| WO | WO 99/63394 | 12/1999 |
| WO | WO 99/67680 | 12/1999 |
| WO | WO 00/11502 | 3/2000 |
| WO | WO 01/81994 | 11/2001 |
| WO | WO 01/84228 | 11/2001 |
| WO | WO 02/24570 | 3/2002 |
| WO | WO 02/24570 A1 | 3/2002 |
| WO | WO 02/071132 | 9/2002 |
| WO | WO 03/007049 A1 | 1/2003 |
| WO | WO 03/032058 | 4/2003 |
| WO | WO 03/056876 | 7/2003 |
| WO | WO 03/073151 | 9/2003 |
| WO | WO 03/075207 | 9/2003 |
| WO | WO 03/105198 | 12/2003 |
| WO | WO 2004/006003 | 1/2004 |
| WO | WO 2004/036236 | 4/2004 |
| WO | WO 2004/068270 | 4/2004 |
| WO | WO 2004/068460 | 8/2004 |
| WO | WO 2005/011012 | 2/2005 |
| WO | WO 2005/076051 | 8/2005 |
| WO | WO 2005/088367 | 9/2005 |
| WO | WO 2006/036440 | 4/2006 |
| WO | WO 2006/036451 | 4/2006 |
| WO | WO 2006/036496 | 4/2006 |
| WO | WO 2006/036519 | 4/2006 |
| WO | WO 2006/036540 | 4/2006 |
| WO | WO 2006/036564 | 6/2006 |
| WO | WO 2006/076051 | 7/2006 |
| WO | WO 2006/137337 | 12/2006 |
| WO | WO 2007/127046 | 11/2007 |
| WO | WO 2008/039229 | 4/2008 |
| WO | WO 2008/045207 | 4/2008 |
| WO | WO 2008/045311 | 4/2008 |
| WO | WO 2008/109620 | 9/2008 |
| WO | WO 2009/052324 | 4/2009 |
| WO | WO 2009/052326 | 4/2009 |
| WO | WO 2009/114394 | 9/2009 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani, et. al., "Surface micromachined tuneable interferometer array", Sensors and Actuators A, vol. A43, No. 1/3, May 1, 1994, pp. 17-23.

Conner, "Hybrid Color Display Using Optical Interference Filter Array," SID Digest, pp. 577-580 (1993).

Fan et al., "Channel Drop Filters in Photonic Crystals", Optics Express, vol. 3, No. 1, 1998.

Giles et al., "Silicon MEMS Optical Switch Attenuator and Its Use in Lightwave Subsystems", IEEE Journal of Selected Topics in Quanum Electronics, vol. 5. No. 1, Jan./Feb. 1999,pp. 18-25.

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119, 1121 (Sep. 1994).

Huang, et al., "Multidirectional Asymmetrical Microlens-Array Light Control Films for High Performance Reflective Liquid Crystal Displays", SID Digest, 2002, pp. 870-873.

Jerman et al., "A Miniature Fabry-Perot Interferometer Fabricated Using Silicon Micromaching Techniques," IEEE Electron Devices Society (1988).

Jerman et al., "A Miniature Fabry-Perot Interferometer with a Corrugated Silicon Diaphragm Support", (1990), Ref. No. CH2783-9/90/0000-0140 © IEEE.

Little et al., "Vertically Coupled Microring Rosonator Channel Dropping Filter", IEEE Photonics Technology Letters, vol. 11, No. 2, 1999.

Magel, "Integrated Optic Devices Using Micromachined Metal Membranes", SPIE vol. 2686, 0-8194-2060-3/1996.

Mehregany et al., "MEMS Applications in Optical Systems", IEEE/LEOS 1996 Summer Topical Meetings, pp. 75-76, (Aug. 5-9, 1996).

Miles, Interferometric Modulation: MOEMS as an enabling technology for high-performance reflective displays, Proceedings of the SPIE, 4985:28, pp. 131-139, Jan. 2003.

Miles, Mark, W., "A New Reflective FPD Technology Using Interferometric Modulation", The Proceedings of the Society for Information Display (May 11-16, 1997).

Miles, MW "A MEMS Based Interferometric Modulator (IMOD) for Display Applications" Proceedings of Sensors Expo, Oct. 21, 1997 © 1997 Helmer's Publishing, Inc. (Oct. 21, 1997), pp. 281-284 XP009058455.

Raley et al., "A Fabry-Perot Microinterferometer for Visible Wavelengths," IEEE Solid-State Sensor and Actuator Workshop, Hilton Head, SC, pp. 170-173 (1992).

Sperger et al., "High Performance Patterned All-Dielectric Interference Colour Filter for Display Applications", SID Digest, pp. 81-83, (1994).
Tai, C.Y. et al., "A Transparent Front Lighting System for Reflective-type Displays," 1995 SID International Symposium Digest of Technical Papers, Orlando, May 23-25, 1995, SID International Symposium Digest of Technical Papers, Santa Ana, SID, US vol. 26, May 23, 1995. pp. 375-378.
Walker, et al., "Electron-beam-tunable Interference Filter Spatial Light Modulator", Optics Letters vol. 13, No. 5, pp. 345-347, (May 1988).
IPRP dated Mar. 27, 2007 for PCT/US05/032886 (International Publication No. WO 2006/036564).
Austrian Search Report for U.S. Appl. No. 11/036,965 dated Jul. 25, 2005 (Patent No. 7,342,705).
Austrian Search Report for U.S. Appl. No. 11/064,143 dated Aug. 12, 2005 (Publication No. 2006-0132383 ).
Austrian Search Report for U.S. Appl. No. 11/052,004 dated Jul. 1, 2005 (Patent No. 7,349,141).
Austrian Search Report for U.S. Appl. No. 11/051,258 dated May 13, 2005.
ISR and WO for PCT/US2005/002986 dated Aug. 6, 2005 (PCT Publication WO 2006/076051).
ISR and WO for PCT/US2005/032021 dated Oct. 1, 2006 (PCT Publication WO 2006/036496).
ISR and WO dated Jan. 10, 2006 in International Application No. PCT/US2005/030968 (International Publication No. WO 2006/36440).
ISR and WO in PCT/US2005/031238 (International Publication No. WO 2006/036451) dated Dec. 14, 2005.
Partial European Search Report dated Jan. 25, 2006 in European Patent Application No. 05255638.8 (European Publication No. Ep 1640764).
European Search Report dated May 4, 2006 in European Patent Application No. 05255638.8 (European Publication No. EP 1640764).
Extended European Search Report in European Application No. 05255715.4 mailed Feb. 28, 2008 (European Publication EP 1 640780).
Extended European Search Report for App. No. 065255657.8 dated Dec. 7, 2005 (European Publication No. EP 1640767).
Hohlfeld et al.; "Micro-machined tunable optical filters with optimized band-pass spectrum"; 12$^{th}$ International Conference on Transducers, Solid-State Sensors, Actuators and Microsystems; vol. 2, Jun. 8-12, 2003, pp. 1494-1497.
ISR and WO for International Application No. PCT/US2005/002986 dated Jun. 8, 2005 (International Publication No. WO 2005/076051).
ISR and WO for International Application No. PCT/US2005/032021 dated Jan. 10, 2006 (International Publication No. WO/2006 036496).
ISR and WO for International Application No. PCT/US2005/032335 dated Dec. 30, 2005 (International Publication No. WO 2006/036519).
European Search Report for European Application No. 05255646.1 dated Feb. 6, 2007 (European Publication No. EP 1640313).
ISR and WO for International Application No. PCT/US07/08790 dated Nov. 2, 2007 (International Publication No. WO 2007/127046).
Written Opinion for International Application No. PCT/US 07/04277 dated Apr. 3, 2008 (International Publication No. WO 2008/039229).
International Preliminary Report on Patentability for International Application No. PCT/US 07/04277 dated Apr. 3, 2008 (International Publication No. Wo 2008/039229).
Austrian Search Report dated Jul. 14, 2005 for U.S. Appl. No. 11/077,974, U.S. Publication No. 2006-0077122.
International Search Report in App. No. PCT/US03/20433 dated Sep. 23, 2003 (International Publication No. WO 2004/006003).
Wu, "Design of a Reflective Color LCD Using Optical Interference Reflectors", ASIA Display '95, pp. 929-931, (Oct. 1995).
International Search Report in App. No. PCT/US2008/055829 dated Jul. 4, 2008 (International Publication No. WO 2008/109620).
Official Communication in Chinese App. No. 200580032162.2 dated Nov. 14, 2008.
Neal T.D., et. al., "Surface Plasmon enhanced emission from dye doped polymer layers," Optics Express Opt. Soc. America, USA, vol. 13, No. 14, pp. 5522-5527, Jul. 11, 2005.
Petschick, et.al., "Fabry-Perot-Interferometer", May 14, 2002, available at http://pl.physik.tu-berlin.de/groups/pg279/protokolless02/04_fpi.pdf.
Official Communication in European App. No. 05 255 646.1 dated Apr. 27, 2009.
International Search Report and Written Opinion in PCT/US2007/021376(International Publication No. WO 2008/045311) dated Jun. 18, 2008.
International Search Report in PCT/US2008/080222(International Publication No. WO 2009/052324) dated Jun. 19, 2009.
International Search Report in PCT/US2008/080225 (International Publication No. WO 2009/052326) dated Jun. 19, 2009.
International Search Report and Written Opinion in PCT/US2005/032633(International Publication No. WO 2006/036540) dated Feb. 6, 2006.
Official Communication in Chinese Application No. 200580032162.2, dated Jan. 22, 2010.
Abileah A., "Optical Tiled AMLCD for very large display applications," SID International Symposium Digest of Papers, Boston, pp. 945-949, May 17, 1992.
"Glass Polarizing and Interference Filters," American Institute of Physics Handbook, pp. 6-172-6-178, 1982.
Official Communication in Japanese Patent Application No. 2007-533543 mailed Oct. 6, 2009.
Official Communication in Japanese Patent Application No. 2007-533543 mailed Jun. 1, 2010.

* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

US 7,807,488 B2

DISPLAY ELEMENT HAVING FILTER MATERIAL DIFFUSED IN A SUBSTRATE OF THE DISPLAY ELEMENT

RELATED APPLICATIONS

This application claims priority under 35 U.S.C. § 119(e) to U.S. Provisional Application Ser. No. 60/613,481, filed on Sep. 27, 2004, which is hereby expressly incorporated by reference in its entirety.

FIELD OF THE INVENTION

The field of the invention relates to microelectromechanical systems (MEMS).

DESCRIPTION OF THE RELATED TECHNOLOGY

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

In one embodiment, a method of forming a display device comprises the steps of diffusing a material into a substrate, said material having a different optical property than said substrate, and forming at least one light modulating element over the substrate, the light modulating element comprising a partially reflective surface and a substantially reflective surface that form an optical cavity, at least one of said reflective surfaces movable with respect to the other to modulate said optical cavity.

In another embodiment, a display device comprises at least one light modulating element comprising first and second reflective surfaces, said second surface being movable with respect to said first surface, and a substrate, said light modulating element disposed over said substrate, wherein said substrate comprises a color filter that transmits color light when illuminated by white light.

In another embodiment, a display device comprises at least one light-modulating element comprising first and second reflective surfaces, said second surface being movable with respect to said first surface, and a substrate, said light-modulating element disposed over said substrate, wherein said substrate incorporates at least one patterned mask.

In another embodiment, a display device comprises a plurality of light-modulating elements each comprising first and second reflective surfaces, said second surface being movable with respect to said first surface, and a substrate, said plurality of light-modulating elements disposed over said substrate, wherein said substrate includes therein first absorptive regions, said absorptive regions having different optical transmission properties than second regions in said substrate disposed between said first absorptive regions.

In another embodiment, a display device comprises at least one plurality of light modulating elements each comprising first and second reflective surfaces, said second surfaces being movable with respect to said first surfaces, and a substrate, said at least one plurality of light modulating elements disposed over said substrate, wherein said substrate comprises a plurality of elements configured to limit a field-of-view of the display device.

In another embodiment, a method of forming an interferometric modulator comprises the steps of combining a substrate material with a filter material in order to form a mixture, heating the mixture so that the substrate material substantially melts and the filter material is diffused within the melted substrate material, cooling the mixture in order to form a substrate, and forming at least one light modulating element over the substrate, the light modulating element comprising a partially reflective surface and a substantially reflective surface that form an optical cavity, at least one of said reflective surfaces movable with respect to the other to modulate said optical cavity.

In another embodiment, a method of operating a display device comprises the steps of illuminating an array of light modulating elements over a substrate, the substrate incorporating a filter material diffused therein, the light modulating element comprising a partially reflective surface and a substantially reflective surface that form an optical cavity, at least one of said reflective surfaces being movable with respect to the other to modulate said optical cavity, and viewing light reflected from the array of light modulating elements, wherein as an angle between a direction of the reflected light and a normal to the surface of the substrate increases, a filtering performed by the filter material increases.

In another embodiment, an apparatus comprises a display comprising one or more light modulating elements. In one embodiment, each light modulating element comprises first and second reflective surfaces, said second surface being movable with respect to said first surface, and a substrate having a filter material diffused therein, said light modulating element being disposed over said substrate, a processor that is in electrical communication with said one or more light modulating elements, said processor being configured to process image data. In one embodiment, the apparatus further comprises a memory device in electrical communication with said processor.

In another embodiment, a display device comprises means for modulating light, and means for supporting said light modulating means, and means for filtering light disposed in said supporting means.

In another embodiment, a display device comprises means for modulating light, and means for supporting said light modulating means, and means for limiting a field-of-view.

DETAILED DESCRIPTION OF THE PREFERRED EMBODIMENT

The following detailed description is directed to certain specific embodiments of the invention. Various embodiments of the invention, for example, relate to incorporating optical filter functionality into a substrate of a display element. Filter functionality may be provided by any filter material, such as pigment materials, fluorescent materials, and opaque material, for example. The filter material may be incorporated in the substrate at the time of creating the substrate or may be selectively diffused in the substrate through a process of masking the substrate, exposing the substrate to the filter material, and heating the substrate in order to diffuse the filter material in the substrate.

The invention, however, can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
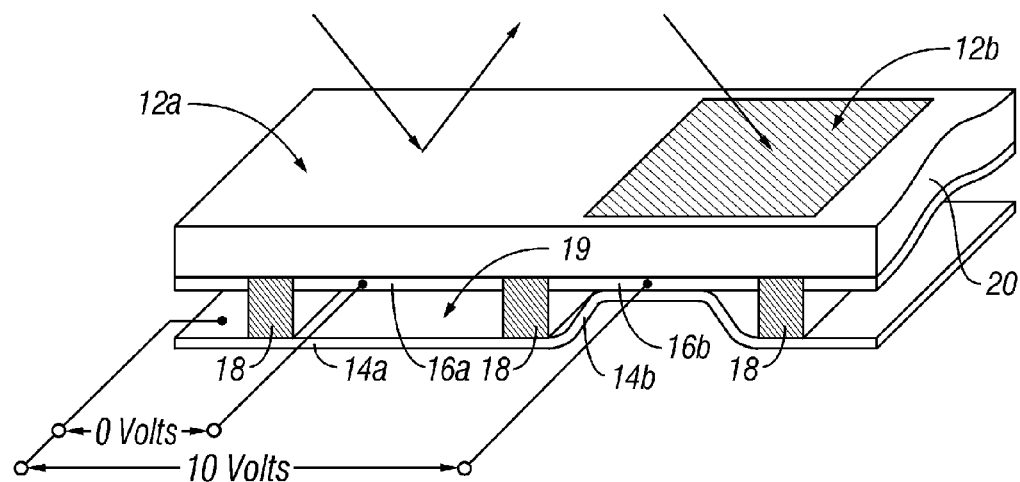
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14*b* is illustrated in an actuated position adjacent to the optical stack 16*b*.

The optical stacks 16*a* and 16*b* (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14*a*, 14*b* may be formed as a series of parallel strips of a deposited metal layer or layers (orthogonal to the row electrodes of 16*a*, 16*b*) deposited on top of posts 18 and an intervening sacrificial material deposited between the posts 18. When the sacrificial material is etched away, the movable reflective layers 14*a*, 14*b* are separated from the optical stacks 16*a*, 16*b* by a defined gap 19. A highly conductive and reflective material such as aluminum may be used for the reflective layers 14, and these strips may form column electrodes in a display device.

With no applied voltage, the cavity 19 remains between the movable reflective layer 14*a* and optical stack 16*a*, with the movable reflective layer 14*a* in a mechanically relaxed state, as illustrated by the pixel 12*a* in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
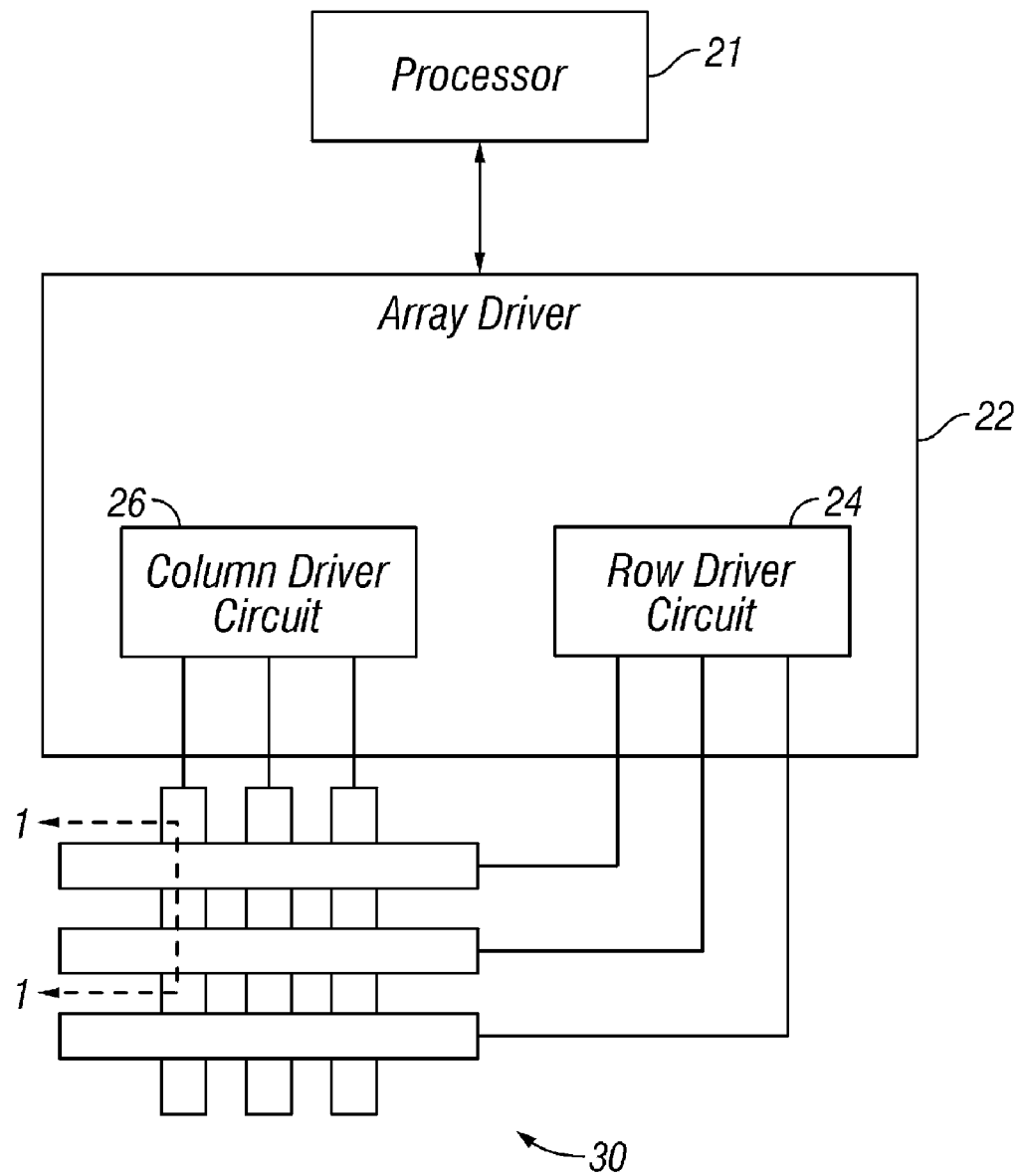
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
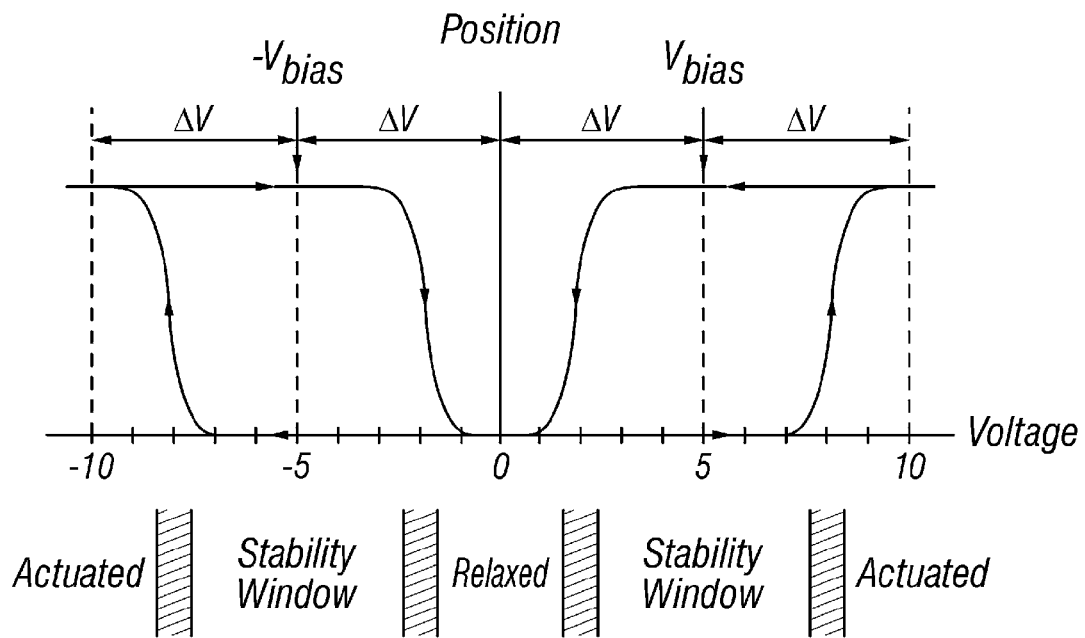
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to −ΔV. In this embodiment, releasing the pixel is accomplished by setting the appropriate column to $-V_{bias}$, and the appropriate row to the same −ΔV, producing a zero volt potential difference across the pixel.

Figure 5A:
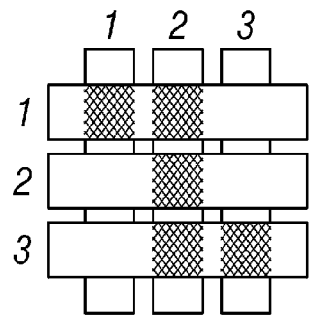
FIGS. 5A and 5B illustrate one exemplary timing diagram for row and column signals that may be used to write a frame of display data to the 3×3 interferometric modulator display of FIG. 2.
Figure 5B:
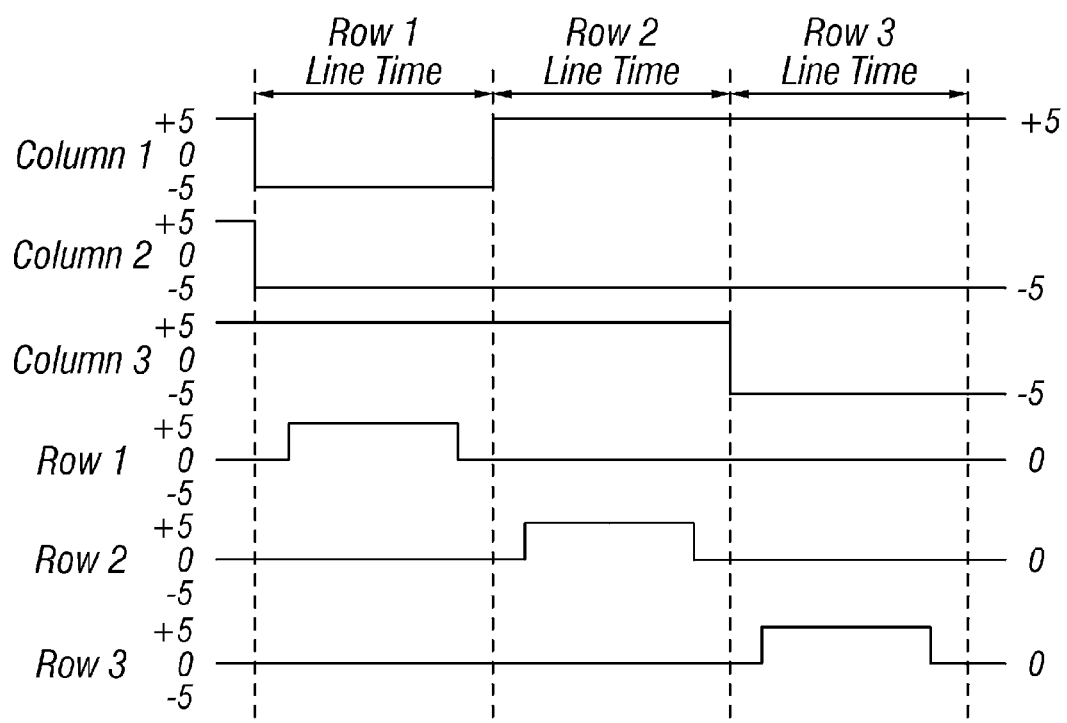

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
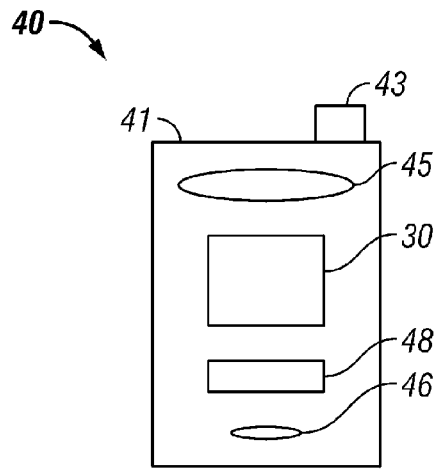
FIGS. 6A and 6B are system block diagrams illustrating an embodiment of a visual display device comprising a plurality of interferometric modulators.
Figure 6B:
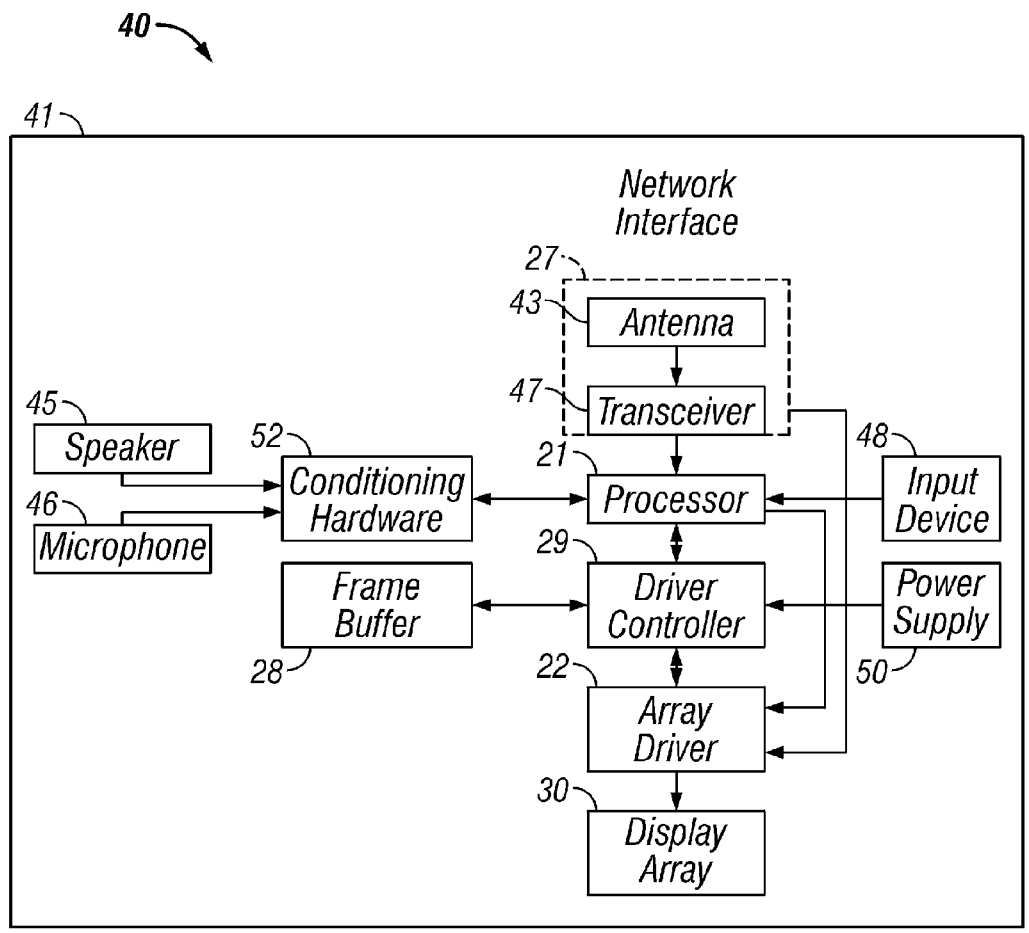

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
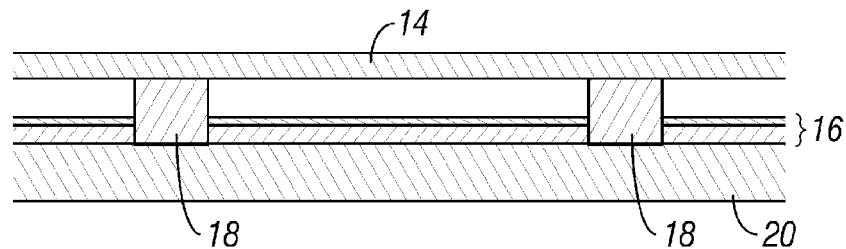
FIG. 7A is a cross section of the device of FIG. 1.
Figure 7B:
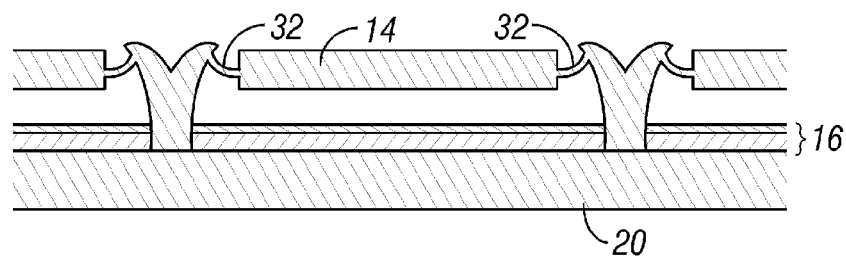
FIG. 7B is a cross section of an alternative embodiment of an interferometric modulator.
Figure 7C:
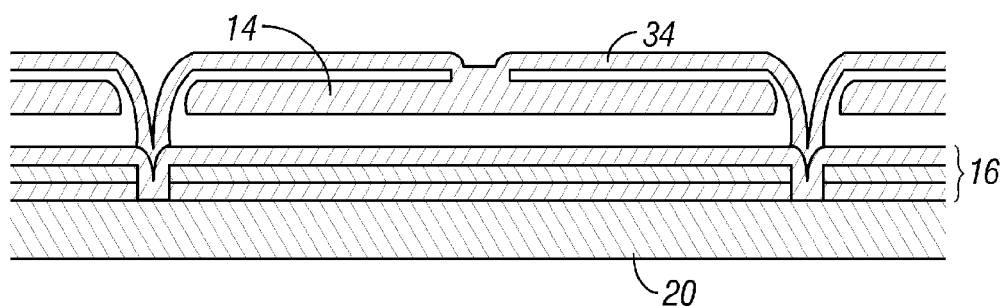
FIG. 7C is a cross section of another alternative embodiment of an interferometric modulator.
Figure 7D:
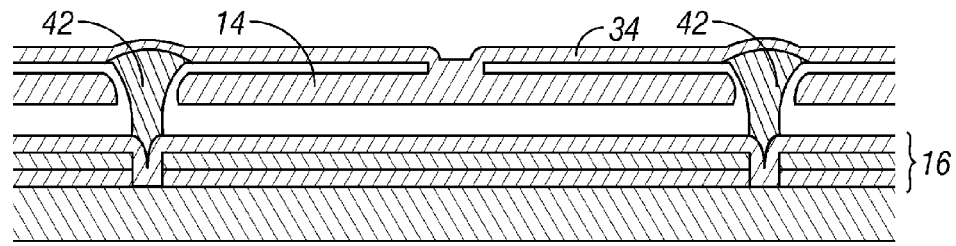
FIG. 7D is a cross section of yet another alternative embodiment of an interferometric modulator.
Figure 7E:
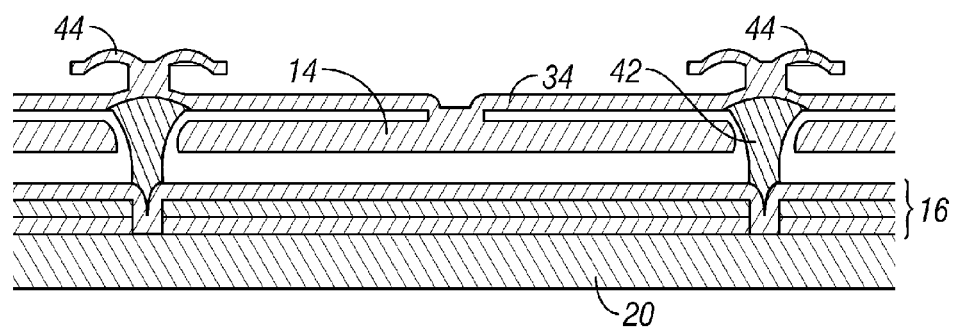
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

It can sometimes be advantageous to place various types of filters between the viewer and the interferometric modulator structures to enhance the quality of the display. In some cases, these filters may be separate from the interferometric modulator structure and placed between the substrate and the viewer. Such separate filters have the advantage of easy replacement, however, overall thickness of the interferometric modulator display package is increased and in some cases additional optical complications can arise due to the filter-air-substrate interfaces. In other cases, the filter may be incorporated into a film that is formed on or adhered to one or more surfaces of the substrate. However, it may be difficult to incorporate the desired filter functionality into the film due to its thinness.

In various embodiments of the present invention, filter functionality is incorporated into the substrate of the interferometric modulator itself, eliminating the need for a separate structure. Such a system may simplify manufacturing of interferometric modulators and reduce a thickness of interferometric modulators that include filters. In addition, inclusion of filters in a substrate, rather than in a separate thin film, for example, may decrease the interferometric modulator's sensitivity to moisture and resistance to scratching. Specific non-limiting examples of substrate filter systems are described below.

Figure 8:
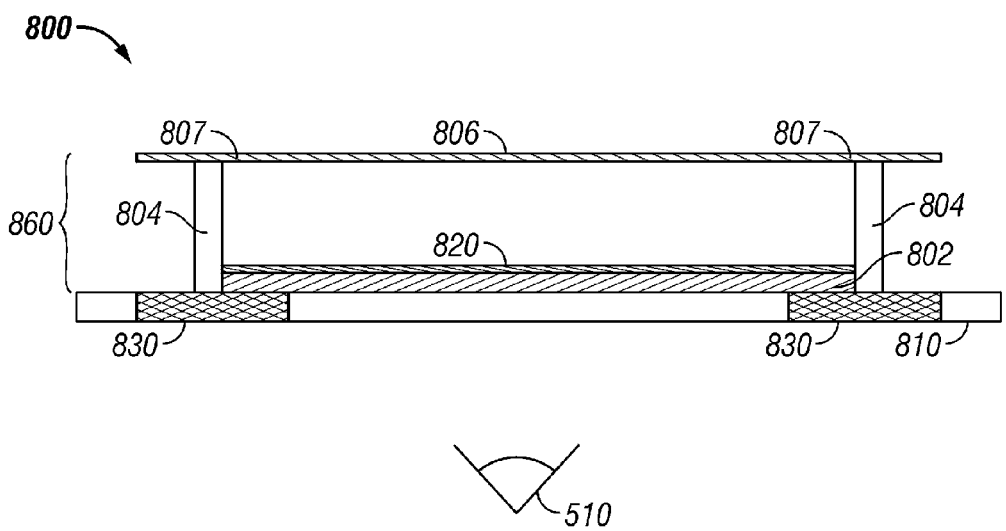
FIG. 8 is a cross section of an interferometric modulator having dark tinting in selected portions of the substrate.

FIG. 8 is a cross sectional side view of an interferometric modulator 800 having dark tinting in selected portions of the substrate. The interferometric modulator 800 comprises a movable mirror 806 separated from a partial reflector 802 by supports 804. In FIG. 8, the partial reflector 802 is adjacent a substrate 810 that includes selective dark tinting 830. Exemplary FIG. 8 also illustrates a dielectric 820 in the interferometric modulator and a viewing eye 510. As used herein, the term "light modulating element" and "modulating element" are used interchangeably and each include the structures between, and including, a movable mirror and a partial reflector of the interferometric modulator. With reference to FIG. 8, for example, a light modulating element 860 comprises the structure between, and including, the movable mirror 806 and the partial reflector 802.

As illustrated in FIG. 7A, for example, portions of support structures 18 are visible to a viewer through the substrate 20. These support structures 18 may have inherent reflectivities that may decrease the contrast and sharpness of the interferometric modulator based images. Furthermore, edge portions 807 (FIG. 8) of each interferometric modulator 800 (FIG. 8) may exhibit reflectivity even when the interferometric modulator is driven to a dark state because the movable mirror 806 at the edge portions 807 will not fully collapse. Therefore, it may be advantageous to use patterned dark filtering to mask the reflectivity of support structures and edge portions of interferometric modulators while still permitting unobstructed viewing of the center of each interferometric modulator structure.

Accordingly, the substrate 810 may include regions 830 with dark tinting 830 separated by regions without such dark tinting. The dark tinting can range from lightly tinted to substantially dark tinted. In some cases, the tinting may be colored. The range of tint of the color and also vary from light coloring to deep coloration. A stripped, checkered, or criss-cross pattern may be used. Other patterns are also possible.

In one embodiment, a patterned dark tinting 830 is incorporated into the substrate 810 using pigments. Any absorber pigments known in the art for dark tinting (e.g., of glass or polymer) may be incorporated into the substrate 810. Other types of pigments or dyes or other material, both well known, or yet to be devised may be employed.

In one embodiment, the material 830 is formed in the substrate 810 by forming patterns of filter material, such as a pigment material, on the surface of the substrate, followed by softening of the glass to allow the filter material to diffuse into the interior of the substrate 810. More particularly, exemplary processes of incorporating dark tinting 830, or any other filters described herein, in the substrate 810 may involve masking portions of the substrate, applying the filter material to the substrate, and diffusing the filter material in the substrate. These processes may be accomplished in several manners, a few of which are described below.

In one embodiment, a shadow mask comprising a thin sheet of metal, or other rigid material, is patterned with holes that correspond with portions of the substrate into which the filter material is to be diffused. The shadow mask may then be placed on the substrate and the filter material applied to the substrate. After applying the filter material, the shadow mask may be removed, leaving the filter material only on the desired areas.

In another embodiment, the filter material may be applied directly to the substrate using an ink-jet printing technique, for example, In this embodiment, the filter material may be applied only on those portions of the substrate that are to diffuse the filter material. In another embodiment, ink-jet printing techniques may be used to form a mask on the substrate, wherein the mask corresponds with non-filtered portions of the substrate, such as portions of the substrate 810 between dark tinting 830 in FIG. 8.

In certain embodiments, filter material is applied to the substrate 810 using an adhesive medium, such as alcohol, for example, that is bound to the filter material. In an advantageous embodiment, the adhesive material is evaporative so that when the substrate 810 is later heated, the adhesive material will be removed from the substrate 810. In another embodiment, the filter material does not include an adhesive material, but is held in place on the substrate 810, for example, by gravity. Other methods may also be used to expose the unmasked portions of the substrate 810 to the filter material.

In another embodiment, the filter material is applied to selected portions of the substrate using photolithography techniques. In one embodiment, the filter material is first applied to the entire substrate. A photoresist material is then coated on the filter material and is patterned using an appropriate light source. The patterned portions of the photoresist material may then be removed using a solvent, leaving the photoresist material only on those portions that are to have the filter material diffused in the substrate. In one embodiment, the same solvent, or an additional solvent, removes the filter material from the patterned portions so that when the remaining photoresist material is removed, the filter material remains only on the desired areas of the substrate.

With the filter material on the substrate, using any one or more of the techniques described above or other suitable techniques, the substrate 810 is heated to a temperature sufficient to diffuse the filter material into the substrate 810. In one embodiment, the substrate 810 is heated to a temperature in the range of about 200-250 degrees Celsius. In another embodiment, the substrate 810 is heated to a temperature in the range of about 150-300 degrees Celsius. The substrate 810 is maintained at this temperature for a time sufficient to allow the desired amount of filter material to diffuse in the substrate 810. This time period may be in the range of a few minutes to several hours, depending on the particular filter material, substrate 810 material, and filtering specifications, until the filter material is sufficiently diffused in the substrate 810.

In certain embodiments, the filter material, such as pigment material, diffuses only through a portion of the thickness of the substrate 810. For example, the dark tinting 830 may extend only through about 1/N of the thickness of the substrate 810, where N is a positive integer. Accordingly, depending on the filtering specifications, the heating and diffusion process may be modified in order to cause diffusion to a desired depth of the substrate 810.

In other embodiments, the filter material may be incorporated in the substrate 810 as the substrate is being formed. For example, in various embodiments the substrate 810 comprises a polymer material that is made by melting polymer pellets and forming a sheet of melted polymer material. A filter material, such as pigment, may be added to the polymer pellets prior to heating, or during heating, and mixed with the melted pellets. Thus, the filter material may be substantially uniformly diffused in the melted polymer and in the resultant polymer substrate 810. A similar process may be used to incorporate a filter material in a glass substrate 810.

In one embodiment, because of the relative thickness of the substrate 810, the density of the absorber pigments in the dark tinting 830 does not need to be as high as when the tinting is in the form of a thin film. Filters may alternatively comprise one or more thin films that are adhered to either side of the substrate of an interferometric modulator. When these one or more thin films are added to an interferometric modulator, a total thickness of the interferometric modulator structure is increased by at least a thickness of the thin films. The interferometric modulator embodiments described herein advantageously incorporate filter material in the substrate of interferometric modulators, thus reducing or minimizing the total thickness of the interferometric modulator structure when compared to a similar interferometric modulator having similar filter material in a separate thin film.

Figure 9:
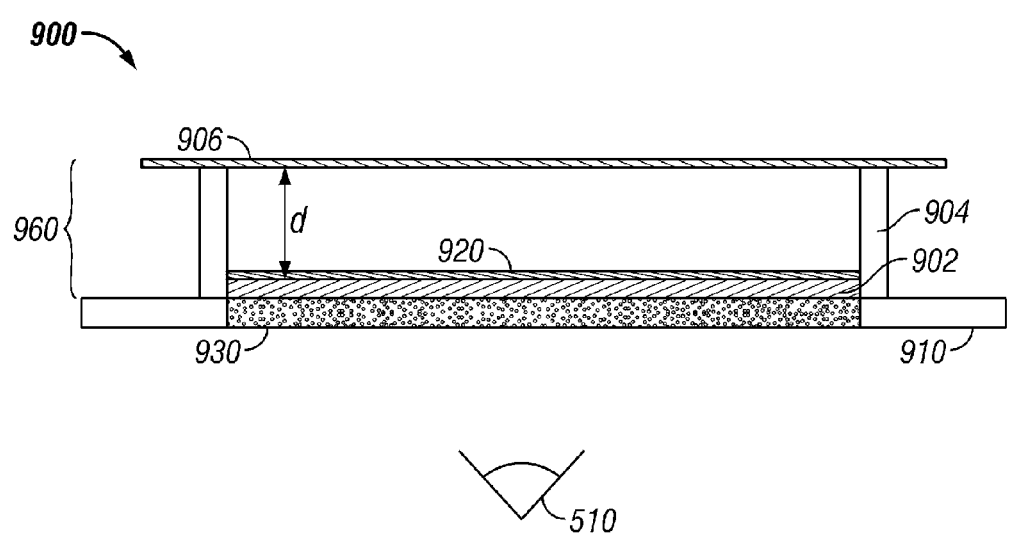
FIG. 9 is a cross section of an interferometric modulator having colored tinting in the substrate.

FIG. 9 is a cross section of an interferometric modulator 900 having colored tinting 930 incorporated in a substrate 910. The exemplary interferometric modulator 900 comprises a light modulating element 960 including a movable mirror 906 separated from a partial reflector 902 by supports 904. In FIG. 9, the distance between the movable mirror 906 and partial reflector 902 is configured so that the interferometric modulator 900 reflects second order red light. In the embodiment of FIG. 9, the partial reflector 902 is adjacent the substrate 910 that includes colored tinting 930. Exemplary FIG. 9 also illustrates a dielectric 920 in the light modulating element 960 and a viewing eye 510.

As explained above, interferometric modulators are configured so that a distance between two reflective surfaces creates constructive interference that results in particular wavelengths of light being reflected. In one embodiment, the optical path length d between reflective surfaces, such as the movable mirror 906 and the partial reflector 902, of approximately ½ the wavelength of a particular color of light will allow the reflected light of that color to experience constructive interference, thus reflecting that color back to a viewer. As is well know in the art, optical path length factors in the index of refraction of the medium (e.g., dielectric layer 920) through which the light propagates.

With respect to FIG. 9, for example, as the optical path length d between the partially reflective mirror 902 and movable mirror 906 is increased, longer wavelengths are, in general, reflected light. In certain embodiments, constructive interference may also occur when the distance between the reflective mirror 902 and movable mirror 906 is a multiple of ½ the wavelength of the desired color, such as approximately 1× the wavelength and 1½× the wavelength, etc. Each time this occurs, the "order" of the light being generated increases. For example, when the gap distance is approximately ½ the desired wavelength, the color is called a first order color. When the optical path length d is approximately equal to the wavelength, it is called a second order color, at approximately 1½×the wavelength is a third order color. In the relaxed state illustrated in FIG. 9, the optical path length d is set to about the wavelength of red light so that the interferometric modulator 900 reflects second order red light.

If a colored pixel is designed to use an interferometric modulator that reflects a second order red color, the interferometric modulator spectral characteristics exhibit both a peak in the blue region as well as the red peak. This is due to the second order red and third order blue peaks being resonant at the same time. Therefore, the color quality of the red interferometric modulator may be reduced when compared to a first order red interferometric modulator. However, the color quality may be enhanced by using a red filter to filter out the blue peak. As shown in FIG. 9, a patterned red tinting 930 is incorporated into the substrate 910 over the second order red light modulating element 960. Pigments, dyes, or other filter materials, both known in the art or yet to be devised, may be incorporated into the substrate 910, which may comprise, e.g., glass or polymer. The systems and methods described above with respect to FIG. 8 may be used. For example, a red pigment may be adhered to the substrate 910, the substrate 910 may be heated, and the red pigment may diffuse into the substrate 910 so that the substrate 910 includes the red pigment material. Other methods and approaches may also be used. As noted above, with the patterned tinting 930 in the substrate 910, the relative size of the interferometric modulator 900 may be smaller than a similar interferometric modulator having a thin film red filter.

Those of skill in the art will recognize that a similar technique may be used to filter out any other undesirable spectral peaks appearing at visual wavelengths in higher order interferometric modulator reflections by choosing the appropriate color pigment or dye or color filter material.

Figure 10:
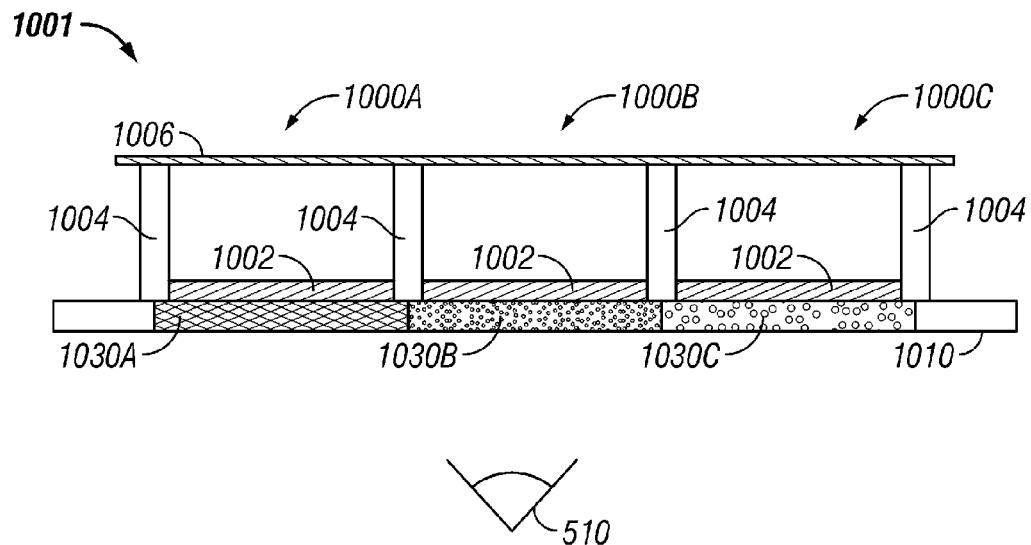
FIG. 10 is a cross section of an interferometric modulator having selective colored tinting in the substrate, wherein multiple colors of tinting are selectively incorporated in the substrate.

FIG. 10 is a cross section of three (first, second, and third) light modulating elements 1000A, 1000B, 1000C forming, for example, a pixel in a spatial light modulator array 1001 for a display. The light modulating elements 1000A, 1000B, 1000C are disposed on a substrate 1010 having colored tinting 1030A, 1030B, 1030C aligned with the respective light modulating elements. Each of the light modulating elements 1000 comprises a movable mirror 1006 separated from a partial reflector 1002 by supports 1004. In FIG. 10, the light modulating elements 1000 are configured to reflect light in at least three color wavelengths, such as red, green, and blue. In one embodiment, each of the light modulating elements 1000 exhibit broadband reflectance upon actuation (i.e., almost no gap between the movable mirror 1006 and the partial reflector 1002 except for a dielectric material layer in some embodiments). In this exemplary embodiment, in the actuated state, each light modulating element acts as a fully reflective mirror, reflecting every wavelength of incident light.

In the embodiment of FIG. 10, a wavelength of light viewable by the viewing eye 510 from each light modulating element 1000 is adjusted by incorporating colored filters 1030 in the substrate 1010. For example, the interferometric modulator array 1001 comprises a red tinting 1030A forward of the first light modulating element 1000A, a blue tinting 1030B forward of the second light modulating element 1000B, and a green tinting 1030C forward of the third light modulating element 1000C. Thus, the array 1001 provides three colors from light modulating elements having the same dimensions. In this embodiment, manufacturing of color interferometric modulator displays may be simplified because an entire display may be made with the same gap distance between the movable mirror 1006 and partial reflector 1002 and patterning the substrate to include color filters. In one embodiment, the three light modulating elements 1000A, 1000B, 100C comprise a pixel of a display.

Any suitable colored pigments known in the art for achieving colored tinting (e.g., of glass or polymer) may be incorporated into the substrate 1010. Other pigments, dyes, or coloring materials may also be used. In one embodiment, the patterned tinting 1030A, 1030B, 1030C is incorporated in the substrate 1010 by forming patterns of pigment material onto the surface of the substrate 1010 using a mask, for example. Other techniques, such as those described above with reference to FIG. 8, may also be used in order to pattern the filter material on the substrate 1010. In one embodiment, in order to selectively apply three different filter materials, such as a red, green and blue pigment, to the substrate 1010, three patterning steps, such as the photolithography or ink-jet techniques described above, are sequentially performed. As described above with reference to FIG. 8, the substrate 1010 may be heated to allow the pigment material to diffuse into the substrate 1010. A wide range of methods of fabricating these arrays 1001 and the substrates 1010 are possible.

In certain embodiment, an interferometric modulator may include fewer or more colors patterned in a substrate than described with reference to FIG. 10. In other embodiments, a substrate including multiple colored patterning, such as the substrate 1010, may also include dark tinting forward of the supports and edge portions of the modulating elements. In this embodiment, four patterning steps may be performed to apply the three colors and the dark tinting in the desired locations on the substrate. In one embodiment, after the multiple filter materials are patterned on the substrate 1010, the substrate is heated to a sufficient temperature for a sufficient time so that each of the filter materials diffuse in the substrate 1010.

Figure 11A:
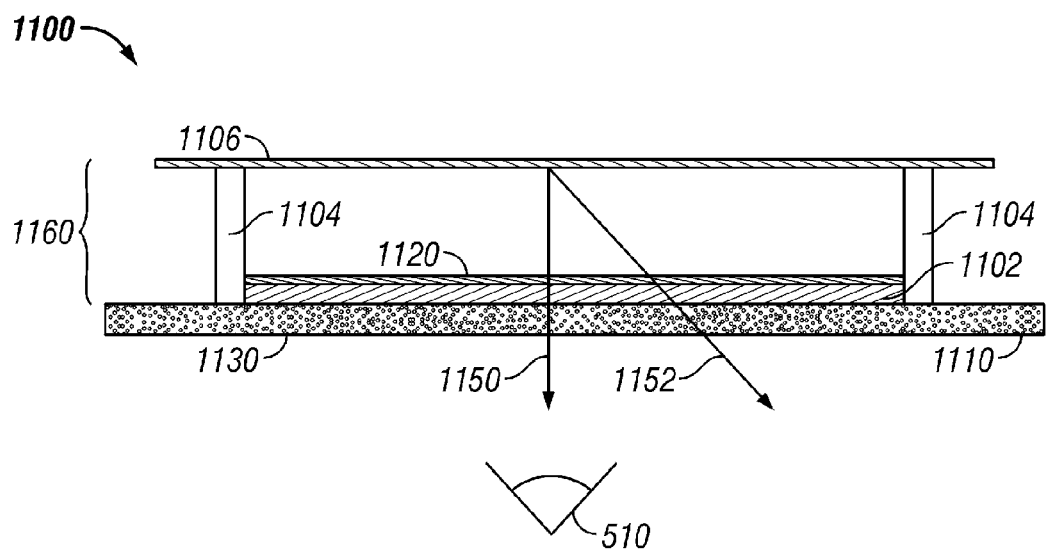
FIG. 11A is a cross section of another interferometric modulator having colored tinting in the substrate.

FIG. 11A is a cross section of another interferometric modulator 1100 having colored tinting 1130 in the substrate 1110. The exemplary interferometric modulator 1100 comprises a light modulating element 1160 comprising a movable mirror 1106 separated from a partial reflector 1102 by supports 1104. In FIG. 11A, a distance between the movable mirror 1106 and partial reflector 1102 is configured so that the light modulating element 1160 reflects first order green light. In the embodiment of FIG. 11A, the partial reflector 1102 is adjacent a substrate 1110 that includes colored tinting 1130. Exemplary FIG. 11A also illustrates a dielectric 1120 in the light modulating element 11630 and a viewing eye 510.

As noted above, the light modulating element 1160 is configured to reflect first order green light, which may have a greater perceived brightness and contrast to a viewing eye 510 when compared to other colors of light. However, it may be desirable that the bright pixels appear white instead of green. Thus, in the embodiment of FIG. 11A, the colored tinting 1130 comprises a magenta filter that reduces the intensity of wavelengths near the peak of the green spectrum reflected from the light modulating element 1160. With the colored tinting 1130 in the substrate 1110, light reflected from the interferometric modulator 1100 exhibits spectral characteristics that are perceived as white.

In one embodiment, an appropriate magenta colored tinting 1130 is incorporated in the substrate 1110 of an interferometric modulator array comprising light modulating elements configured to constructively modulate first order green wavelengths. Accordingly, the viewing eye 510 perceives the interferometric modulator 1100 as either black or white. As described above, the magenta colored tinting 1130 may be incorporated by a process of applying an appropriate magenta pigment to the substrate 1110 and heating the substrate 1110 in order to allow the pigment to diffuse in the substrate 1110, or through use of other patterning techniques described herein or known in the art.

Figure 11B:
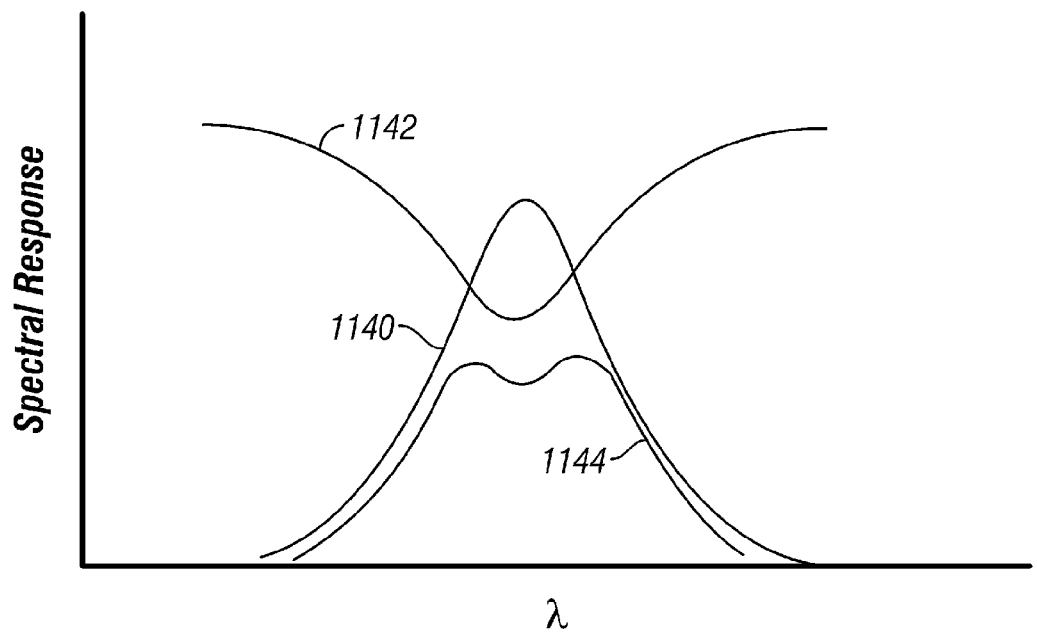
FIG. 11B is a graphical diagram illustrating the spectral response of one embodiment that includes a green modulating element and a substrate incorporating magenta filtering material.

FIG. 11B is a graphical diagram illustrating the spectral response of one embodiment that includes the modulating element 1160 and the substrate 1110 incorporating magenta filtering material. The horizontal axis represents the wavelength of reflected light. The vertical axis represents the relative spectral response over the visible spectrum. A trace 1140 illustrates the response of the light modulating element 1160, which is a single peak centered in the green portion of the spectrum, e.g., near the center of the visible spectrum. A trace 1142 illustrates the response of the substrate 1110 incorporating magenta filtering material. The trace 1142 has two relatively flat portions on either side of a central u-shaped minimum. The trace 1142 thus represents the response of a magenta filter that selectively transmits substantially red and blue light while filtering light in the green portion of the spectrum. A trace 1144 illustrates the combined spectral response of the modulating element 1160 and the substrate 1110. The trace 1144 illustrates that the spectral response of the combination is at a lower reflectance level than the modulating element 1160 due to the filtering of light by the filter material incorporated in the substrate 1110. However, the spectral response is relatively uniform across the visible spectrum so that the filtered, reflected light from the interferometric modulator 1100 is perceived as white.

In some embodiments, gradient tinting may be incorporated into the substrate, such as the substrate 1110, so that as the viewing angle increases from normal to the substrate 1110, the amount of reflected light that is filtered by the tinting increases. Thus, the further from normal to the substrate a viewer is from an interferometric modulator display, the more dim the image. For example, if the viewing eye 510 is positioned so that the it sees light reflected from the interferometric modulator 1100 in direction 1150, which is normal to the front surface of the substrate 1110, the viewing eye 510 sees light that has twice passed through a thickness, t, of the substrate 1110 including the filter material (e.g., the light passes through the substrate 1110 when entering the interferometric modulator 1100 and passes through the substrate 1110 again when leaving the interferometric modulator 1100). When the viewing eye 510 moves to a position so that it sees light reflected from the interferometric modulator 1100 in an off-normal direction 1152, a thickness of the substrate 1110 that the reflected light passes through has increased. For example, if the angle between directions 1150 and 1152 is about 45 degrees, the thickness of the substrate 1110 across direction 1152 is about t*1.414. Accordingly, the light seen by the viewing eye 150 at direction 1152 has passed through about three times the amount of substrate 1110 as the light passes through in direction 1150 (e.g., the light passes through a thickness of about t*1.4 twice, which is about 2.8 t), and through about three times as much of the filtering material in the substrate 1110. Thus, if the filter material in the substrate 1110 absorbs certain wavelengths of light, as the angle between the direction 1150 and the viewing eye 510 increases, the amount of the certain wavelengths that are absorbed by the substrate 1110 will also increase.

Figure 12A:
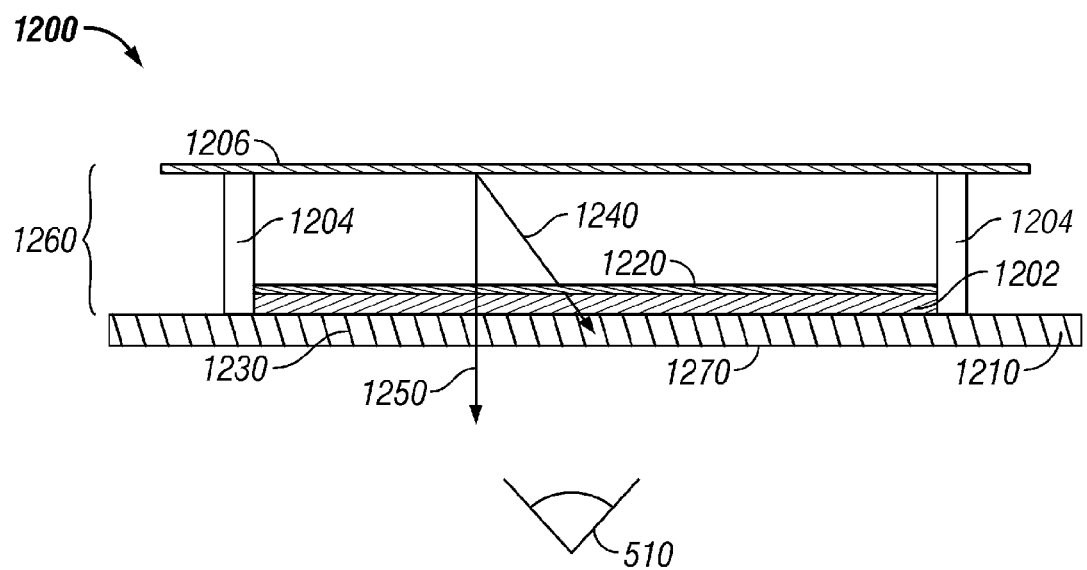
FIGS. 12A illustrate an interferometric modulator having field-of-view filter incorporated in the substrate.

FIG. 12A is a cross section of an interferometric modulator 1200 having field-of-view filters 1230 incorporated in the substrate 1210. The exemplary interferometric modulator 1200 comprises a light modulating element 1260 including a movable mirror 1206 separated from a partial reflector 1202 by supports 1204. Exemplary FIG. 12A also illustrates a dielectric 1220 in the light modulating element 1260 and a viewing eye 510.

In some cases, it may be desirable that an interferometric modulator display have a limited viewing angle. For example, when using an interferometric modulator display in an ATM, it may be desirable that the display is only visible from angles near to perpendicular to the surface of the display to preserve the privacy of the information being displayed. Furthermore, the color of light reflected from an interferometric modulator changes with the angle of reflected of light. Accordingly, it may be desirable to remove the viewer observation of this color shifting by limiting the viewing angle. In the embodiment depicted in FIG. 12A, a viewing angle of the interferometric modulator 1200 is limited by incorporating field-of-view filters 1230 (also referred to herein as blinds 1230 or baffles 1230) into the substrate 1210. By incorporating the blinds 1230 into the substrate 1210 instead of in a separate film, a substrate 1210 having baffles 1230 separated by a predetermined distance may provide greater angle reduction than a thin film having baffles separated by the same predetermined distance, due to the increased length of the baffles 1230 in the substrate.

As illustrated in FIG. 12A, the blinds 1230 comprise thin structures that are substantially perpendicular to the substrate 1210 surface. Thus, light reflected from the light modulating element 1260 that is directed substantially parallel to the blind structures 1230, such as in an exemplary direction 1250, will pass through the substrate 1210 largely unaffected by the blinds 1230. In contrast, light reflected from the light modulating element 1260 at other angles, such as in an exemplary direction 1240, may be partially blocked by the blinds 1230, depending on the angle of reflection. Those of skill in the art will recognize that the field-of-view may be adjusted by selecting the shape, orientation, size, and spacing of the blinds 1230. For example, the baffles 1230 may have a size, shape, and spacing to provide a field-of-view no more than about ±20 degrees as measured about the direction 1250, which is normal to a front surface 1211 of the substrate 1210. The field-of-view may therefore be between about ±20, ±25, ±30, ±35 and ±40 degrees or less as measured about the direction 1250. In one exemplary embodiment, the baffles 1230 provide the display 1200 with a field-of-view of about ±30 degrees normal to the front surface 1270.

A variety of techniques may be used to create the baffles 1230. In one embodiment, glass laminates are used. In this embodiment, one or more glass laminates may be patterned with filter materials and heated together to form a single substrate incorporating the filter material. In another embodiment, a first laminate may be patterned with a filter material, using one or more of the techniques described above, for example, and a second laminate may be placed on the patterned surface of the first laminate. The laminates may then be heated in order to concurrently diffuse the filter material into both of the laminates. In this embodiment, the filter material may advantageously be located in the centered of the formed substrate structure. In addition, because the filter material concurrently diffuses into two materials, the heating time may be reduced.

In other embodiments, filter materials are formed into thin lines onto the surface of the substrate using one or more techniques described above. In one embodiment, the substrate is patterned with a grid pattern using one or more of the techniques described above. In embodiments where the filter material is diffused in the substrate in order to form baffles, the heating time may be reduced so that lateral diffusion into the substrate is reduced or minimized, while allowing the filter material to diffuse into a top surface of the substrate. In one embodiment, the filter material is diffused into only about a top ⅓ of the substrate when forming baffles.

Because the baffles are intended to substantially absorb light reflected from certain angles of the modulating element 1260, in certain embodiments the baffles are as thin as possible. In addition, in certain embodiments the filter material used to form the baffles 1230 comprises a material that diffuses in the heated substrate in a substantially normal direction to a surface of the substrate 1210. In another embodiment, the filter material used to form baffles has a higher melting point than the substrate 1210 so that when the substrate 1210 is heated, the filter material sinks into the substrate material, without significant diffusion. Thus, the baffles 1230 are substantially the thickness of the higher melting point filter material. In one embodiment, a ceramic material may be used for such a filter material. In one embodiment, a ceramic material may be patterned in a series of rows, columns, or a grid configuration, and then a molten substrate material may be poured over the patterned ceramic material. When the substrate material hardens, the patterned ceramic material will form baffles in the substrate.

Figure 12B:
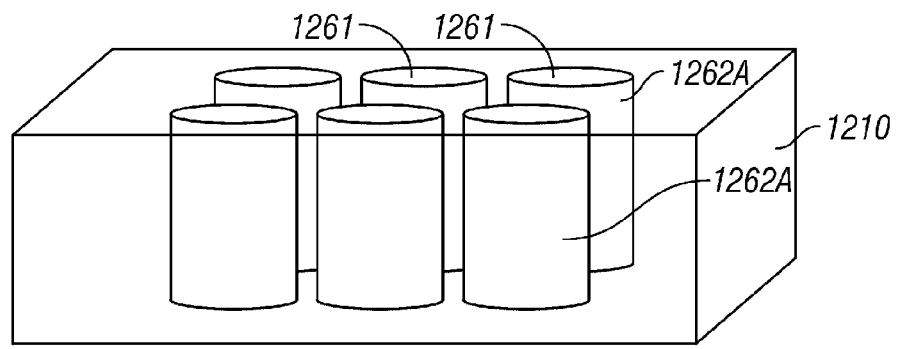
FIGS. 12B-12C illustrate an exemplary method of fabricating field-of-view filters in a substrate.
Figure 12C:
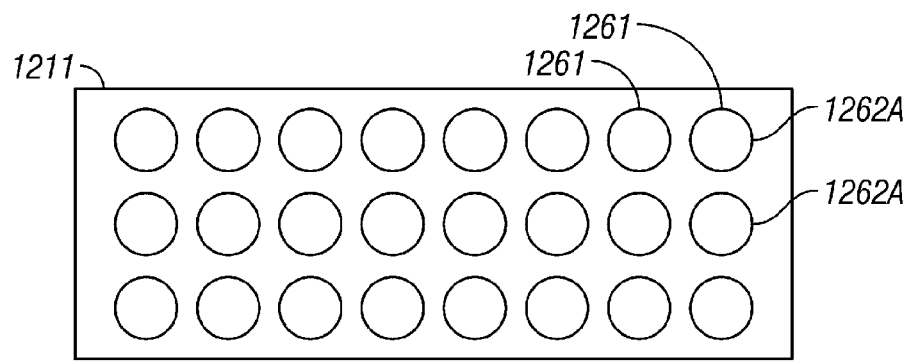

FIG. 12B is a perspective side view and FIG. 12C is a top view of an exemplary substrate 1211 having baffles 1261 incorporated in the substrate 1211. In the embodiment of FIGS. 12B and 12C, the baffles 1261 are substantially vertically aligned columnar features. In one embodiment, the outer surfaces 1262a of the baffles 1261 are coated with an opaque material. The baffles 1261 may be disposed in the substrate 1211 by any of the methods discussed above, such as by heating the substrate 1211, placing the baffles on a top surface of the substrate 1211, and allowing the baffles to sink into the substrate 1211.

In certain embodiments, the baffle structures 1230, 1261 shown in FIGS. 12A-12C may comprise reflective material. If a portion of the baffle 1230, 1261 nearest to the light modulating element is substantially reflective, then light reflected from the light modulating element that is incident on the reflective portion of the baffle 1230, 1261 will not pass through the substrate 1210, 1211, but will be reflected back to the light modulating element. In certain embodiments, the outer surfaces 1263 of the baffle structures 1261 (FIG. 12B) may be made of a substantially reflective material, such as a flash coating of substantially reflective material.

Figure 13:
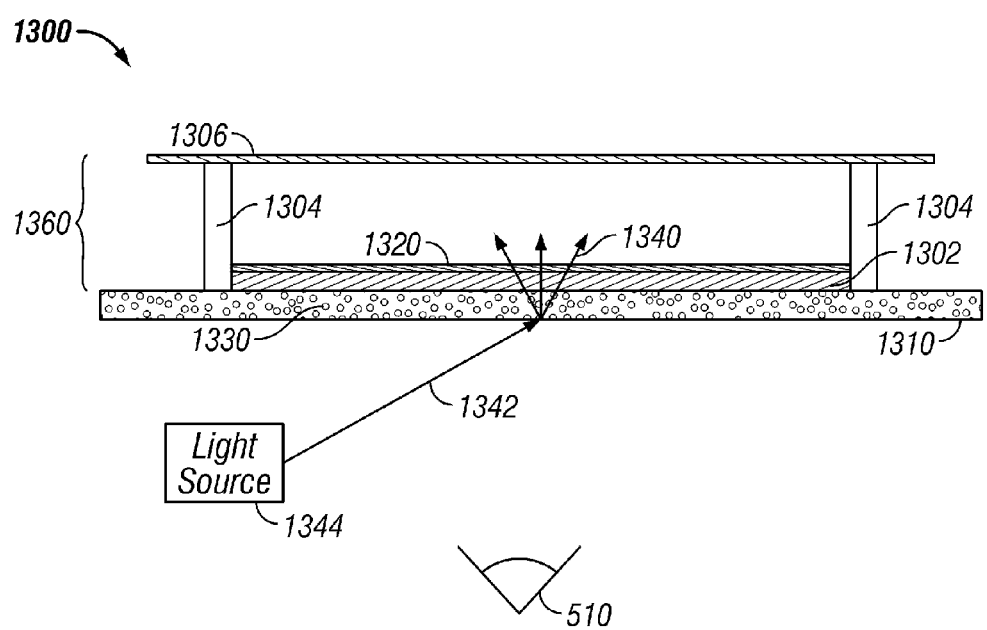
FIG. 13 is a cross section of an interferometric modulator having photoluminescent materials in the substrate.

FIG. 13 is a cross section of an interferometric modulator 1300 having photoluminescent materials 1330 in the substrate 1310. The exemplary interferometric modulator 1300 comprises a light modulating element 1360 including a movable mirror 1306 separated from a partial reflector 1302 by supports 1304. In the embodiment of FIG. 13, the partial reflector 1302 is adjacent a substrate 1310 that includes photoluminescent material 1130. Exemplary FIG. 13 also illustrates a dielectric 1320 in the light modulating element 1360 and a viewing eye 510. Photoluminescent materials, as used herein, includes those materials that have phosphorescent and/or fluorescent properties. Examples of possible photoluminescent materials include those described in U.S. Pat. No. 6,278,135 to LUMI (long afterglow photoluminescent pigment, from Global Trade Alliance Inc, Scottsdale, Ariz.), and the materials that comprise BC-482A and BC-484, wavelength shifter bars (Saint-Gobaln Crystals and Detectors, Newbury Ohio).

In various embodiments, the photoluminescent material 1330 provides front illumination of the interferometric modulator 1300 upon excitation with appropriate light. For example, in certain embodiments a light source 1344 comprises a short wavelength light source, such as a blue LED, that may be used to excite the photoluminescent material 1330, which then emits light 1340 at longer wavelengths. In one embodiment, multiple photoluminescent materials 1330 are incorporated to emit light at different wavelengths in light modulating elements. For example, one set of interferometric modulators may include a photoluminescent material 1330 that emits light having spectral characteristics similar to light reflected by blue modulating elements, another set of interferometric modulators may include a photoluminescent material 1330 that emits light having spectral characteristics similar to light reflected by green modulating elements, and a third set of interferometric modulators may include a photoluminescent material 1330 that emits light having spectral characteristics similar to light reflected by red modulating elements. Thus, by altering the photoluminescent material 1330 associated with light modulating elements in an array, a monochrome display may be converted to a multi-color display.

In one embodiment, the excitation light source 1344 may be located such that the light 1342 contacts the substrate 1310 from the side of the interferometric modulator 1300. In this embodiment, the photoluminescent material 1330 advantageously emits light 1340 in all directions, thus providing substantially uniform illumination within the light modulating element 1360.

In other embodiments, the light source 1344 may be located at any other location proximate the substrate 1310 of the interferometric modulator 1300. The photoluminescent materials 1330 may be incorporated into the substrate 1310 as small particles or may be dissolved into the substrate 1310, such as by the heating and diffusing methods described above with reference to other embodiments. Alternatively, the photoluminescent materials 1330 may be uniformly mixed into the substrate 1310 as the substrate 1310 is formed. Other methods may be used as well. Those of skill in the art will recognize many photoluminescent materials that will be suitable for front lighting of an interferometric modulator display. Photoluminescent material both well known, as well as those yet to be devised, may be employed.

A wide range of variation in design and configuration are also possible. In addition to incorporating different materials into the substrate, in different quantities, for different applications, a variety of different patterning may be used. The amount or type of material introduced into the substrate may vary with depth in the substrate or may vary laterally, for example, to create gradation and to form different patterns. The size of the features in the pattern may also vary. Combination of materials may be introduced into the substrate. Still other variations in the configuration and resultant structures as well as methods of fabrication are possible.

Moreover, the foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of forming a display device, the method comprising:
   diffusing a material into a substrate, said material having a different optical property than said substrate; and
   forming at least one light modulating element over the substrate, the light modulating element comprising a partially reflective surface and a substantially reflective surface that form an optical cavity, at least one of said reflective surfaces movable with respect to the other to modulate said optical cavity.

2. The method of claim 1, further comprising depositing the material over the substrate.

3. The method of claim 2, further comprising heating the substrate.

4. The method of claim 2, further comprising heating the substrate to a temperature in the range of about 200 to 250 degrees Celsius.

5. The method of claim 3, wherein the substrate is heated for a time sufficient to diffuse the material to a predetermined level within the substrate.

6. The method of claim 5, wherein the predetermined level is less than about ⅓ of a thickness of the substrate.

7. The method of claim 5, wherein the predetermined level is greater than about ⅓ of a thickness of the substrate.

8. The method of claim 1, wherein at least one optical characteristic of the material changes as the material diffuses into the substrate.

9. The method of claim 1, further comprising applying the material to the substrate.

10. The method of claim 9, wherein applying comprises spraying the material.

11. The method of claim 9, further comprising positioning a mask on the substrate prior to applying the material to the substrate.

12. The method of claim 1, wherein the substrate comprises at least one of: glass and polymer.

13. The method of claim 1, wherein the material comprises black pigment.

14. The method of claim 1, wherein the material comprises colored pigment.

15. The method of claim 1, further comprising diffusing different materials into the substrate.

16. The method of claim 15, wherein different materials are diffused for different light modulating elements.

17. The method of claim 1, wherein the light modulating element comprises an interference modulator.

18. The method of claim 1, wherein the light modulating element comprises a micro-electro-mechanical device.

19. The method of claim 1, wherein the display device comprises a reflective display device.

20. The method of claim 1, wherein the display device comprises an interferometric modulator.

21. The method of claim 1, wherein the substantially reflective surface is movable with respect to the partially reflective surface and the substrate.

22. The method of claim 21, wherein the optical cavity is disposed relative to the substrate such that the partially reflective surface is between the substantially reflective surface and the substrate.

23. A method of forming a display device, the method comprising:
   combining a substrate material with a filter material in order to form a mixture;
   heating the mixture so that the substrate material substantially melts and the filter material is diffused within the melted substrate material;
   cooling the mixture in order to form a substrate; and
   forming a plurality of light modulating elements over the substrate, at least one of the light modulating element comprising a partially reflective surface and a substantially reflective surface that form an optical cavity, at least one of said reflective surfaces movable with respect to the other to modulate said optical cavity, the plurality of light modulating elements configured to allow formation of an image on the display device, the display device configured such that the image is viewed through the substrate.

24. The method of claim 23, wherein the raw substrate material comprises at least one of: polymer pellets, sand, flint, or quartz.

25. The method of claim 23, wherein the substrate material is at least partially molten when combined with the filter material.

26. The method of claim 23, wherein the substrate material is not molten when combined with the filter material.

27. The method of claim 23, wherein the plurality of light modulating elements are arranged in an array.

28. The method of claim 27, wherein the display device is configured to be used in a cell phone such that the image is viewed through the substrate from the viewing side of the cell phone.

29. A method of forming an interferometric modulator, the method comprising:
   combining a substrate material with a filter material in order to form a mixture;
   heating the mixture so that the substrate material substantially melts and the filter material is diffused within the melted substrate material;

cooling the mixture in order to form a substrate; and forming at least one light modulating element over the substrate, the light modulating element comprising a partially reflective surface and a substantially reflective surface that form an optical cavity, at least one of said reflective surfaces movable with respect to the other to modulate said optical cavity, the optical cavity disposed relative to the substrate such that the partially reflective surface is between the substantially reflective surface and the substrate.

30. The method of claim 29, wherein the substantially reflective surface is movable with respect to the partially reflective surface and the substrate.

* * * * *